Jan. 26, 1937.  C. F. HAMMOND, JR., ET AL  2,069,143
WORM GEAR ADJUSTMENT FOR STEERING GEARS
Filed April 1, 1935  2 Sheets-Sheet 2
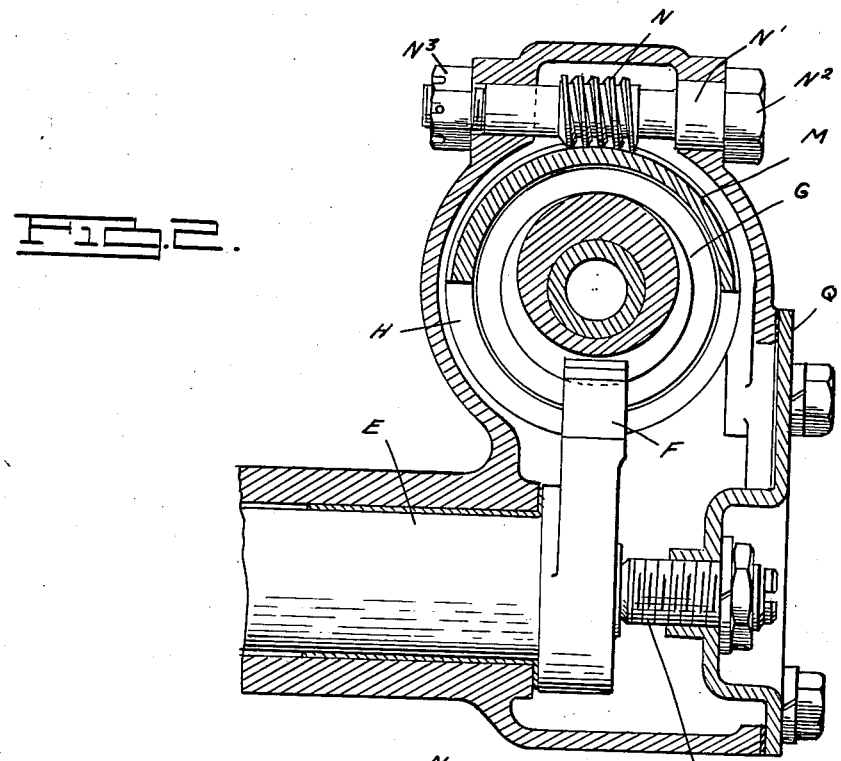
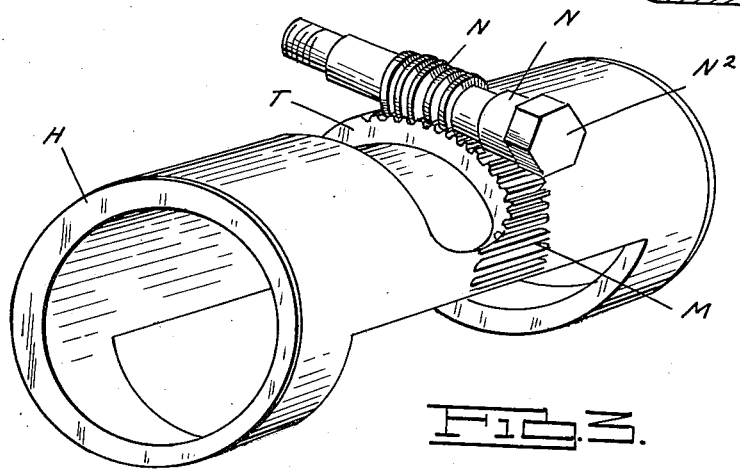
INVENTORS
CHARLES F. HAMMOND JR.
HARPER E. PULLEYBLANK
ATTORNEYS Patented Jan. 26, 1937

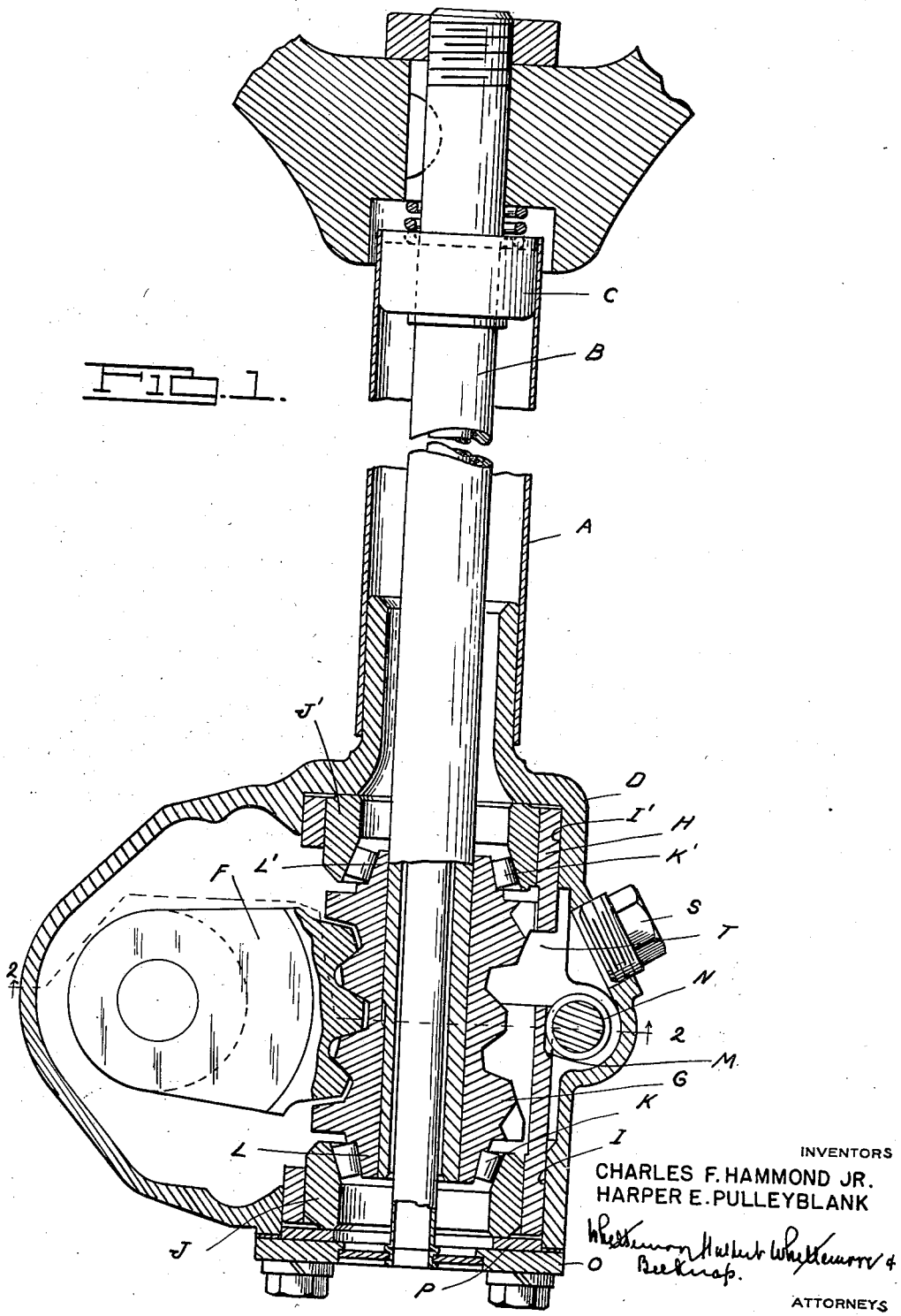

2,069,143

UNITED STATES PATENT OFFICE 2,069,143

WORM GEAR ADJUSTMENT FOR STEERING GEARS

Charles F. Hammond, Jr. and Harper E. Pulleyblank, Detroit, Mich., assignors to Gemmer Manufacturing Company, Detroit, Mich., a corporation of Michigan Application April 1, 1935, Serial No. 14,176

7 Claims. (Cl. 74—500)

The invention relates to steering gears and more particularly to the means for adjusting the worm gearing between the steering stem and rock shaft. It is the object of the invention to simplify the construction and to provide means through which lost motion between the gears can be easily taken up at any time without disassembly of the parts. To this end the invention consists in the construction as hereinafter set forth.

In the drawings:

Fig. 1 is a longitudinal section through the steering post and the worm gear housing of a steering gear;

Fig. 2 is a transverse section substantially on line 2—2, Fig. 1;

Fig. 3 is a perspective view showing the eccentric sleeve and rotary adjustment means therefor.

As illustrated, A is the steering post containing the steering stem B supported at the upper end of the post by a bearing C. D is the gear housing on which the post A is mounted. Journaled within this housing is the rock shaft E having mounted thereon the worm gear wheel F and intermeshing with this gear wheel is the worm G mounted on the stem B.

The usual adjustment between the worm and the gear is by a movement of the gear, the worm remaining in fixed position within the housing. In our improved construction the axis of the worm gear and its rock shaft remains in fixed position within the housing and adjustment is made by a relative movement of the worm and its steering stem, the construction being as follows: H is an eccentric sleeve or bushing which is insertable through an opening in the lower end of the housing D into engagement with cylindrical bearings I and I'. Within the sleeve H are the race members J and J' for the roller bearings K, K' which engage cones L and L' at the opposite ends of the worm. The sleeve H is cut away on one side intermediate the portions engaging the bearings I and I' so as to provide clearance for the worm wheel. The remaining segment has formed on the outer surface thereof a worm gear M which is in mesh with a worm N on a transversely extending shaft N' engaging bearings in the housing D. At one end of this shaft is a polygonal head $N^2$ outside the housing D and at the opposite end a clamping nut $N^3$ engaging a threaded end portion of the shaft. Thus by rotating the head $N^2$ the worm N through its engagement with the worm gear segment M will impart a rotary adjustment to the sleeve H and after such adjustment the parts may be locked by tightening the clamping nut $N^3$.

With the construction as described, it will be understood that the axis of the steering stem B and worm G is eccentric to the axis of the external surface of the sleeve H. Consequently when this sleeve is rotated within the bearings I, I' in the casing D, it will shift the worm laterally towards or from the worm gear F. This adjustment of the worm carries with it the stem B, but the limited amount of movement and the comparatively long distance to the bearing C at the upper end of the post will permit of flexing of the stem, and will not interfere with the free rotation thereof. After introduction of the sleeve H and worm G through the opening in the bottom of the housing D, this opening is closed by a cover plate O. A shim P is placed between this cover plate and the race member J to receive the end thrust and to take up all lost motion in the roller bearings. A removable cover plate Q permits of the insertion of the rock shaft E and worm gear F into the housing and a screw R in this cover plate Q bears against the center of the gear to hold the same in position. Lubrication is introduced through a removable cap S at the side of the housing and the sleeve H is cut away at T adjacent to the gear segment M to permit passage of the lubricant into said sleeve and on to the gears.

While we have described only one specific construction, it is obvious that other specific constructions may be employed for accomplishing the same result. The essential features are, first, that the worm and its operating stem are adjusted within the housing, the worm gear and rock shaft remaining in fixed position; second, this adjustment of the worm is preferably through the rotation of an eccentric bearing; third, there are preferably a pair of eccentric bearings at opposite ends of the worm which are simultaneously and equally adjusted to move said worm in relation to the worm gear.

The eccentric sleeve H while circumferentially surrounding the race members J and J' does not form the end thrust bearings for said race member. Thus the race member J' has an end thrust bearing against the housing D and the race member J contacts with the shim P. Thus the sleeve does not in any way interfere with the adjustment of these race members in taking up all lost motion between the same and the rollers K. Another advantage of this is that when the eccentric sleeve H is rotated for the purpose of adjusting the worm with respect to the worm gear, this rotation is not necessarily imparted to the race members J and J'. Consequently there is less frictional resistance to this adjustment than would be the case if the race members were revolved with the sleeve, for the end pressure on said race members is sufficient to develope a considerable friction between the same and their end bearings respectively on the casing D and shim P.

What we claim as our invention is:

1. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for said worm at opposite ends thereof, eccentric mountings for said journal bearings and means for simultaneously rotating said eccentric mountings independently of any rotation of said bearings to adjust said worm towards or from said worm gear.

2. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, a radial and end thrust journal bearing for said worm, an eccentric sleeve surrounding portions of said worm and said journal bearing within said housing, and means operable from outside said housing for rotating said eccentric sleeve independently of any rotation of said bearings to adjust said worm towards or from said worm gear.

3. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for the opposite ends of said worm, an eccentric sleeve surrounding portions of said worm and said journal bearings and journaled within said housing, and means operable from outside said housing for rotating said eccentric sleeve independently of any rotation of said bearings to move said worm towards or from said worm gear.

4. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for opposite ends of said worm, an eccentric sleeve surrounding portions of said worm and said journal bearings and having a gear segment on its outer face, a spiral gear engaging said gear segment, a shaft on which said spiral gear is mounted extending transversely of said housing and outward through the wall thereof, and a polygonal head at the outer end of said shaft for rotating the same to adjust said worm towards or from said gear.

5. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for opposite ends of said worm, an eccentric sleeve surrounding portions of said worm and said journal bearings, and having a gear segment on its outer face, a spiral gear engaging said gear segment, a shaft on which said spiral gear is mounted extending transversely of said housing with its opposite ends passing through the walls thereof, a polygonal head at one end of said shaft for rotating the same independently of any rotation of said bearings to adjust said worm towards or from said worm gear and a nut engaging a threaded portion on the opposite end of said shaft to clamp the same in any position of adjustment.

6. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for opposite ends of said worm, an eccentric sleeve surrounding portions of said worm and said journal bearings and having a gear segment on its outer face, a gear in mesh with said gear segment and a shaft on which said gear is mounted extending out of said housing and constituting an external means for rotating said eccentric sleeve independently of any rotation of said bearings.

7. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gearing, radial and end thrust journal bearings for said worm at opposite ends thereof, eccentric mountings for said journal bearings, means for axially adjusting one of said journal bearings to take up all axial lost motion of the worm, and means for simultaneously rotating said eccentric mountings independently of any rotation of said bearings to adjust the latter and said worm towards or from said gear.

CHARLES F. HAMMOND, Jr.
HARPER E. PULLEYBLANK.